US012712895B2

(12) United States Patent
Hercock

(10) Patent No.: US 12,712,895 B2
(45) Date of Patent: Aug. 18, 2026

(54) NEURAL NETWORK CONSTRUCTION

(71) Applicant: BRITISH TELECOMMUNICATIONS PUBLIC LIMITED COMPANY, London (GB)

(72) Inventor: Robert Hercock, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 36 days.

(21) Appl. No.: 18/856,453

(22) PCT Filed: Apr. 11, 2023

(86) PCT No.: PCT/EP2023/059430
§ 371 (c)(1),
(2) Date: Oct. 11, 2024

(87) PCT Pub. No.: WO2023/208575
PCT Pub. Date: Nov. 2, 2023

(65) Prior Publication Data
US 2025/0193214 A1 Jun. 12, 2025

(30) Foreign Application Priority Data
Apr. 27, 2022 (EP) .................................... 22170340

(51) Int. Cl.
*H04L 9/40* (2022.01)
*G06N 3/0455* (2023.01)
(Continued)

(52) U.S. Cl.
CPC ....... *H04L 63/1416* (2013.01); *G06N 3/0455* (2023.01); *G06N 3/082* (2013.01); *G06N 3/086* (2013.01); *H04L 41/16* (2013.01)

(58) Field of Classification Search
None
See application file for complete search history.

(56) References Cited

U.S. PATENT DOCUMENTS 6,480,627 B1 * 11/2002 Mathias .................. G06F 18/21 382/209
10,832,136 B2 11/2020 Kadav et al.
(Continued)

FOREIGN PATENT DOCUMENTS

CA 3104951 A1 * 9/2020 ............. G16B 40/20
CA 3168550 A1 * 8/2021 ............. G06N 3/044
(Continued)

OTHER PUBLICATIONS

Erfan Miahi, SeyedAbolghasem Mirroshandela and Alexis Nasr (Genetic Neural Architecture Search for automatic assessment of human sperm images); p. 28; Published in Sep. 18, (Year: 2020).*
(Continued)

*Primary Examiner* — Ali H. Cheema
(74) *Attorney, Agent, or Firm* — Nixon & Vanderhye P.C.

(57) ABSTRACT

A process to construct a neural network for image processing and/or detect security breach events in a telecommunications network is described herein. In the process, a population of software hox genomes is generated, each software hox genome encoding a neural network and comprising, for each of a plurality of zones of the neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone. An evolutionary algorithm is applied to the population of software hox genomes where a fitness function of the evolutionary algorithm comprises a performance of the neural network encoded by a software hox genome on the image processing for recognizing objects in the image and/or on detection of
(Continued)

the security breach events in the telecommunications network.

20 Claims, 4 Drawing Sheets

(51) Int. Cl.

| | |
|---|---|
| ***G06N 3/082*** | (2023.01) |
| ***G06N 3/086*** | (2023.01) |
| ***H04L 41/16*** | (2022.01) |

(56) References Cited

U.S. PATENT DOCUMENTS

| | | | | |
|---|---|---|---|---|
| 11,636,288 | B2 * | 4/2023 | Faust | G06V 10/25 382/128 |
| 2005/0136480 | A1 * | 6/2005 | Brahmachari | G16B 40/00 435/7.1 |
| 2017/0193367 | A1 * | 7/2017 | Miikkulainen | G06N 3/04 |
| 2018/0357507 | A1 * | 12/2018 | Gelbman | G06V 10/82 |
| 2019/0080240 | A1 | 3/2019 | Andoni et al. | |
| 2020/0104715 | A1 * | 4/2020 | Denolf | G06N 3/09 |
| 2020/0356860 | A1 | 11/2020 | Kim et al. | |
| 2021/0020314 | A1 * | 1/2021 | Ehrich | A61P 25/28 |
| 2021/0042579 | A1 * | 2/2021 | Chen | G06V 10/764 |
| 2021/0182691 | A1 | 6/2021 | Andoni et al. | |
| 2022/0269923 | A1 * | 8/2022 | Nadji-Tehrani | G06N 3/0495 |
| 2023/0076603 | A1 * | 3/2023 | Sun | G16B 50/50 |
| 2025/0302863 | A1 * | 10/2025 | Cho | C07K 16/18 |

FOREIGN PATENT DOCUMENTS

| | | | | |
|---|---|---|---|---|
| CN | 108780518 A | * | 11/2018 | G06Q 30/02 |
| CN | 108334949 B | * | 4/2021 | G06N 3/086 |
| CN | 112733584 A | * | 4/2021 | G06N 3/045 |
| CN | 110443879 B | * | 6/2021 | G06N 3/044 |
| CN | 114929892 A | * | 8/2022 | G01N 33/557 |
| JP | H06187473 A | * | 7/1994 | |

OTHER PUBLICATIONS

International Preliminary Report on Patentability dated Nov. 7, 2024, issued for International Application No. PCT/EP2023/059430 (8 pages).

David Ackley, et al., "Interactions between learning and evolution", Artificial Life II, SFI Studies in the Sciences of Complexity, 1991, pp. 487-509.

Rahul Duggal, et al., "CUP: Cluster Pruning for Compressing Deep Neural Networks", Georgia Institute of Technology, Nov. 19, 2019, 10 pages.

Adam Gaier, et al., "Weight agnostic neural networks", 33rd Conference on Neural Information Processing Systems, NeurIPS, 2019, 15 pages.

Robert Ghanea-Hercock, et al., "Distributed Genetic Programming with mobile agents", Intelligent Systems Research Group, Jul. 13, 1999, 1 page.

David E. Goldberg, et al., "Messy Genetic Algorithms: Motivation Analysis, and First Results", Complex Systems, vol. 3, 1989, pp. 493-530 (38 pages).

Song Han, et al., "Deep compression: Compressing deep neural networks with pruning, trained quantization and huffman coding", Published as a conference paper at ICLR, arXiv preprint arXiv:1510.00149, Feb. 15, 2016, 14 pages.

Derek Lemons, et al., "Genomic Evolution of Hox Gene Clusters", Science, vol. 313, Sep. 29, 2006, 7 pages.

Chao Liu et al., "Pruning Deep Neural Networks by Optimal Brain Damage", Center for Speech and Language Technologies (CSLT), Sep. 2014, 4 pages.

Henrik Hautop Lund, et al., "Evolving robot morphology", Proceedings of 1997 IEEE International Conference on Evolutionary Computation (ICEC '97), 1997, 6 pages.

Jian-Hao Luo, et al., "ThiNet: A Filter Level Pruning Method for Deep Neural Network Compression", Jul. 20, 2017, 9 pages.

Erfan Miahi, et al., "Genetic Neural Architecture Search for automatic assessment of human sperm images", Expert Systems With Applications, vol. 188, Sep. 30, 2021, 18 pages.

David J. Montana, et al., "Training Feedforward Neural Networks Using Genetic Algorithms", Machine Learning, Aug. 20, 1989, pp. 762-767 (6 pages).

Christiane Nüsslein-Volhard, et al., "Mutations affecting segment number and polarity in *Drosophila*", Nature, 1980, 30 pages.

Olivier B. Poirion, et al., "DeepProg—An Ensemble of Deep-Learning and Machine-Learning Models for Prognosis Prediction using Multi-Omics Data", Genome Medicine, vol. 13, No. 112, 2021, 15 pages.

Eivind Samuelsen, et al., "A Hox Gene Inspired generative Approach to Evolving Robot Morphology", Conference Paper, Jul. 2013, 9 pages.

A.P. Shanthi, et al., "Exploring FPGA Structures for Evolving Fault Tolerant Hardware", Proceedings of The 2003 NASA/Dod Conference on Evolvable Hardware, downloaded Sep. 30, 2024, 8 pages.

Adrian Thompson, "An Evolved Circuit, Intrinsic in Silicon, Entwined with Physics", Oct. 7, 1996, pp. 390-405 (16 pages).

Tao Wu, et al., "Differential Evolution Based Layer-Wise Weight Pruning for Compressing Deep Neural Networks", Sensors, vol. 21, No. 880, published Jan. 28, 2021, 20 pages.

Combined Search Report and Abbreviated Examination Report for GB Application No. 2206126.1 dated Oct. 14, 2022, 8 pages.

Extended European Search Report for GB Application No. 22170340.8 dated Oct. 20, 2022, 9 pages.

International Search Report and Written Opinion of the ISA for PCT/EP2023/059430 dated Jul. 7, 2023, 15 pages.

* cited by examiner

NEURAL NETWORK CONSTRUCTION

CROSS-REFERENCE TO RELATED APPLICATIONS

This application is the U.S. national phase of International Application No. PCT/EP2023/059430 filed Apr. 11, 2023 which designated the U.S. and claims priority to EP patent application Ser. No. 22/170,340.8 filed Apr. 27, 2022, the entire contents of each of which are hereby incorporated by reference.

BACKGROUND

Neural networks are increasingly widely used for a variety of tasks such as object recognition, telecommunications network management, speech recognition, self-driving vehicles, computer network security and more. Often the neural network architecture is highly complex, involving many layers, different types of layers, encoders, decoders, recurrence and other structures.

Although neural networks with complex architectures are often found to perform accurately and robustly these complex architectures are expensive to operate in terms of power, computing resources and memory. Deploying such complex architectures on resource constrained devices such as smart phones and laptop computers is challenging.

The embodiments described below are not limited to implementations which solve any or all of the disadvantages of known methods of constructing neural networks.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

To construct a neural network for image processing or other tasks, a population of software hox genomes is generated, each software hox genome encoding a neural network and comprising, for each of a plurality of zones of a neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone. An evolutionary algorithm is applied to the population of software hox genomes where a fitness function of the evolutionary algorithm comprises a performance of a neural network encoded by a software hox genome on the image processing or other task.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Figure 1:
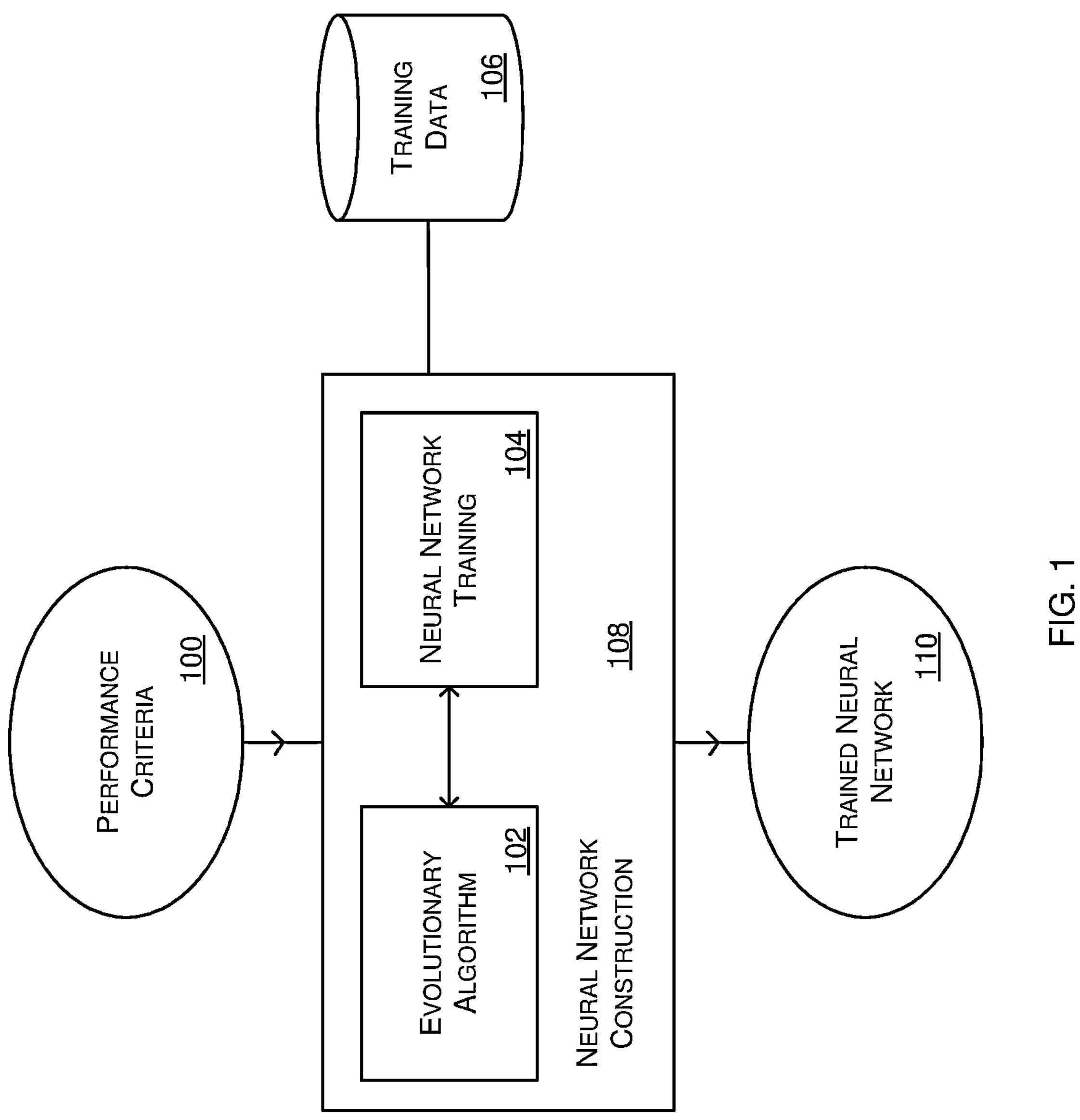
FIG. 1 is a schematic diagram of a neural network construction engine.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above, neural networks are increasingly widely used for a variety of tasks such as object recognition, telecommunications network management, speech recognition, self-driving vehicles, computer network security and more. Often the neural network architecture (i.e. the topology of the network and the types of nodes and connection patterns used) is highly complex, involving many layers, different types of layers, encoders, decoders, recurrence and other structures. The neural network architecture is typically manually created by one or more experts and there is no principled way to construct the neural network architecture automatically which is widely used in practice. As a result many neural network architectures are large and unwieldy and often have redundancy.

As mentioned above, although neural networks with complex architectures are often found to perform accurately and robustly these complex architectures are expensive to operate in terms of power, computing resources and memory. Deploying such complex architectures on resource constrained devices such as smart phones and laptop computers is challenging.

The inventor has recognized that by encoding a neural network using an encoding language such as a software hox genome, it is possible to use evolutionary algorithms to automatically construct neural networks. By careful design of a fitness function of the evolutionary algorithm the resulting neural networks are able to perform with accuracy and yet be compact.

The invention uses the concept of a regulatory Hox gene process to shape the topology and parameters of a neural network, in order to increase the computational efficiency of such networks, and to enable the network to achieve more complex functionality. This process mimics living systems where a hox gene may control the rate of expression of the genes that control the formation of a limb or organ in a life form.

In an example, there is an automated process for constructing a neural network used for an image processing task such as recognizing faces in videos or recognizing objects in images. A population of software hox genomes is generated, each software hox genome encoding a neural network and comprising, for each of a plurality of zones of a neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone. An evolutionary algorithm is applied to the population of software hox genomes where a fitness function of the evolutionary algorithm comprises a performance of a neural network encoded by a software hox genome on the image processing task, where the neural network has been trained for the image processing task using training images. The evolutionary algorithm outputs one of the software hox genomes and the process constructs a neural network encoded by the software hox genome. An image is then processed using the constructed neural network.

The use of a software hox genome to encode a neural network is particularly powerful because it enables zones of a neural network to be taken into account during the construction such as by replicating zones, nesting zones, controlling relative position of zones, controlling weights of nodes in the zones. A zone of a neural network is a plurality of nodes connected by edges. A non-exhaustive list of examples of a zone of a neural network is: neural network layer, series of fully connected layers, autoencoder, encoder, decoder, output layer, multi-layered perceptron. A zone may be considered as a form of masking layer that overlays parameter values within a neural network.

By using an evolutionary algorithm fitness function which comprises a performance of a neural network it is possible to combine neural network training and an evolutionary algorithm in order to automatically construct a neural network with an architecture which is optimal or tailored for the particular task, such as object recognition (or other specified task).

The neural network construction engine facilitates ability to automate the creation of very complex deep learning network (DLN) designs. Current residual neural network (Res-net) designs have a maximum depth of about 150 layers and the neural network construction engine described herein increases the possible depth for DLNs. There is ability to increase the depth of DLN beyond current limits (about 150 layers deep) or to shrink the overall size where current designs have met a target machine learning capability.

By encoding zones there is increased transparency of the final DLN design, as the network will contain distinct zones with identifiable functionality. These zones can also be marked and made visible in a separate neural visualization process, for post training analysis of the evolved neural structure.

Using zones gives the ability to dynamically switch different sections of a DLN on or off. Or inhibit a section to enhance the performance of the overall network.

Using zones also facilitates engage human guidance/recommendation/control. Prior to training it is possible to allocate zones to different components of the problem for modulation into a dynamic programming problem.

In various examples, the fitness function of the evolutionary algorithm also rates smaller neural networks over larger neural networks so as to encourage smaller neural networks to be evolved. By combining neural network performance and neural network size into the fitness function it is possible to construct neural networks automatically which have architectures that perform well and are more compact compared with manually constructed equivalents. The technical challenge thus resolved is the very high computational demands required of existing deep neural networks, typically requiring hundreds of kilowatts of power to learn a complex task such as playing the game of GO.

The neural network construction engine gives increased computational efficiency in the training phase of a DLN. A goal of the process is to minimize the size of the evolved DLN for a given problem in some cases.

In an example, applying the evolutionary algorithm comprises: computing a fitness of each of the software hox genomes using the fitness function by, for each software hox genome: configuring the neural network according to the software hox genome, training the neural network using the training images, measuring performance of the trained neural network at the image processing task and computing the fitness of the software hox genome according to the measured performance. The evolutionary algorithm further comprises, selecting a plurality of the software hox genomes as parents which have a fitness above a threshold, generating offspring software hox genomes from the parents; and replacing the least-fit software hox genomes in the population with the offspring. In this way an evolutionary algorithm is combined with neural network training so as to automatically generate neural network architectures which give good performance.

In an example the neural network construction engine renders a representation of the constructed neural network on a display, the representation comprising marks indicating the zones and topology of the zones in the neural network. This is particularly useful for explainability since a human user is able to view the representation and understand where the zones and are in relation to one another and to relate the zones to parts of the task being performed by the neural network. This helps with providing a human-understandable explanation of how the neural network computes a particular output.

In some examples the method comprises allocating individual ones of the zones to different components of the image processing task. In this way modularity is achieved and is found to facilitate explainability since it is possible to provide a human-understandable explanation of how the neural network computes a particular output.

Preferably, configuring the neural network according to the software hox genome comprises reusing one or more neural network zones. By reusing zones efficiencies are gained since less neural network training is needed as reused zones are already trained in some cases.

In various examples, a software hox genome is a sequence of characters, and wherein each hox gene begins with a unique character combination and terminates with a specified character. By using a sequence of characters an efficient, compact way of encoding a neural network is given which is suitable for use with evolutionary algorithms. By using a unique character combination to begin a hox gene, and a specified character to terminate a hox gene, an efficient way to identify hox genes within the sequence of characters is given.

Preferably, the sequence of characters comprises one or more norm genes, each norm gene comprising characters encoding a zone of the neural network by encoding a number of nodes in the zone, a topology of the zone, an activation function of the nodes in the zone. In this way a compact encoding of zones of the neural network is possible.

In an example, each norm gene encodes a zone of the neural network as one or more of: a fully connected layer, a convolutional layer, a recurrent layer, an encoder neural network, a decoder neural network, an autoencoder neural network, a reinforcement learning network. In this way a compact encoding of zones of the neural network is possible.

In various examples, constructing the neural network comprises pruning an existing neural network. This is particularly useful since an automated way of pruning an existing neural network is given so as to make the neural network more compact without loss of performance. An initial neural network is available in memory and the software hox genome output by the evolutionary algorithm is used to prune the initial neural network. Zones of the initial neural network which are not encoded by the software hox genome are pruned. Zones of the initial neural network corresponding to zones encoded by the software hox genome are modified to be consistent with the zones encoded by the software hox genome.

The methods described herein are suitable for use with a variety of different neural network tasks. An example where the neural network task is detecting security breach events in a telecommunications network is now given. The method comprises generating a population of software hox genomes, each software hox genome encoding a neural network and comprising, for each of a plurality of zones of a neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone. An evolutionary algorithm is applied to the population of software hox genomes where a fitness function of the evolutionary algorithm is a performance of a neural network encoded by a software hox genome on detection of security breach events in a telecommunications network, where the neural network has been trained using labeled event data from the telecommunications network. The evolutionary algorithm outputs one of the software hox genomes and a neural network encoded by the software hox genome is constructed. Measurements from the telecommunications network are processed using the constructed neural network in order to detect security breach events.

FIG. 1 is a schematic diagram of a neural network construction engine 108 which is deployed in a computing device such as a personal computer or is deployed in a data centre and accessed as a service. The neural network construction engine comprises an evolutionary algorithm 102 and a neural network training algorithm 104. The neural network construction engine 108 has access to training data 106 for training a neural network for a specified task. The training data 106 is stored at any location(s) accessible to the neural network construction engine 108. The training data comprises labeled examples for supervised neural network training and/or unlabeled examples for unsupervised or semi-supervised neural network training.

The evolutionary algorithm 102 is an optimization algorithm where candidate solutions are individuals in a population. A fitness function is used to assess quality of the candidate solutions and evolution of the population is done. The quality assessment and evolution is repeated until convergence is reached and a candidate solution from the population with the best quality according to the fitness function is taken as the solution to the optimization problem.

Preferably the evolutionary algorithm is a genetic algorithm or genetic programming process since in this case the candidate solutions may be strings of characters which is an efficient, compact data structure. In addition, strings of characters as a data structure choice enable software hox genomes to be used as explained in more detail below. However, it is not essential to use string of characters as the data structure choice. The software hox genome process is able to use other types of representation such as binary coding or any evolutionary coding schema.

The neural network training algorithm 104 is any suitable neural network training algorithm such as backpropagation.

The neural network construction engine 108 optionally receives as input performance criteria 100 such as a performance level desired for the neural network and/or a size limit for the neural network. The performance criteria are input by a human operator in some cases via a user interface.

The neural network construction engine 108 produces as output a trained neural network 110 which is stored or deployed on another computing entity such as an end user computing device (mobile phone handset, smart watch) or data centre.

The neural network construction engine 108 is implemented at least in part using one or more graphics processing units or other machine learning hardware accelerators in some cases.

Figure 2:
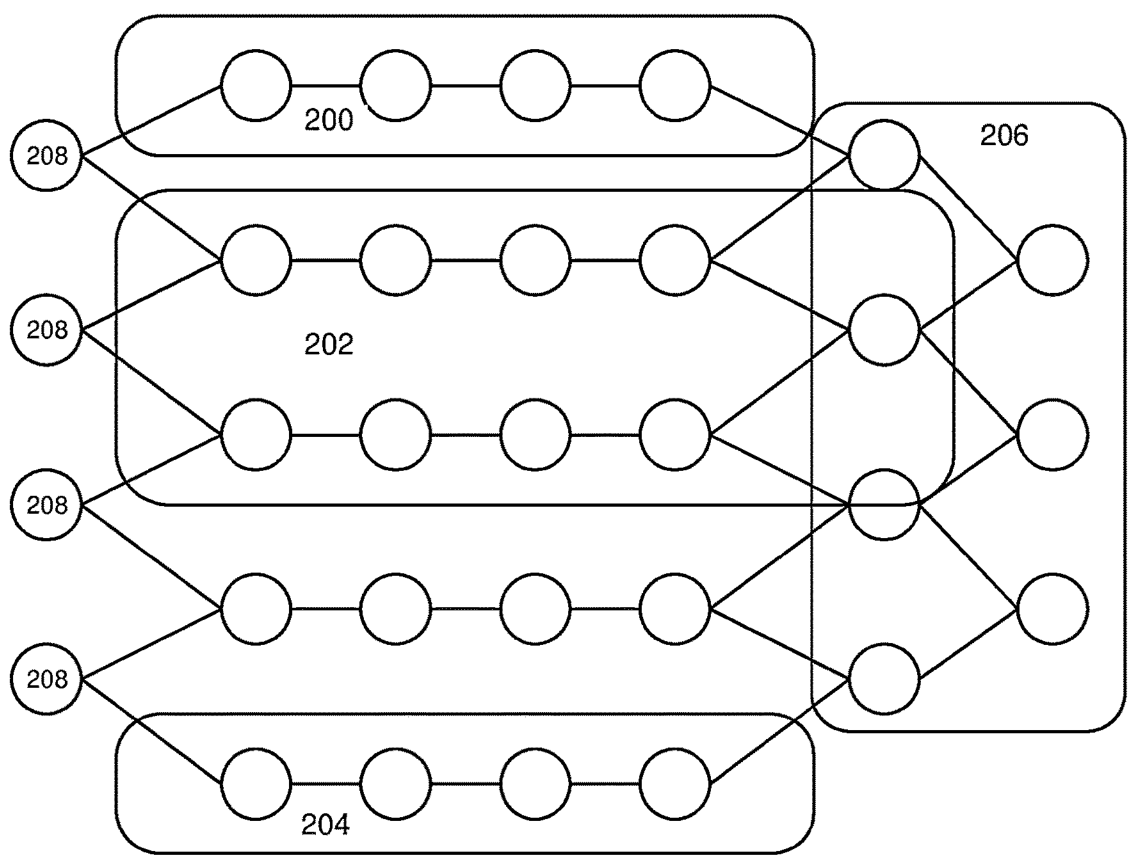
FIG. 2 is a schematic diagram of a neural network with zones.

FIG. 2 is a schematic diagram of a neural network with zones 200, 202, 204, 206. The neural network has input nodes 208 connected to a first layer of intermediate nodes. The zone 200 comprises an uppermost node of each of a plurality of intermediate layers of the neural network and their connecting edges. Zone 200 thus does not correspond to a layer of the neural network. The zone 202 comprises a plurality of intermediate nodes and edges and does not overlap with zone 200. At least one node is illustrated as being only partially in zone 202 and it is assumed that any node, even if partially within a zone as illustrated, is treated as being part of that zone.

The zone 204 comprises a lowermost node of each of a plurality of intermediate layers of the neural network and their connecting edges. Zone 204 does not overlap with another zone.

Zone 206 comprises an output layer of the neural network and an immediately preceding layer of the neural network as well as the connecting edges between these two layers. Zone 206 overlaps with zone 202 as illustrated.

Note that some of the nodes of the neural network are not in any zone (such as the input nodes 208 and some of the intermediate nodes. It is also possible to have examples where all the nodes of the neural network are in at least one zone.

The zones are either manually specified by an operator or are automatically determined using rules. Each zone may be encoded using a software norm gene as part of a software hox genome as described in more detail below.

Note that whilst FIG. 2 illustrates two dimensional zones it is also possible to have three dimensional zones and to have a mixture of two and three dimensional zones.

Figure 3:
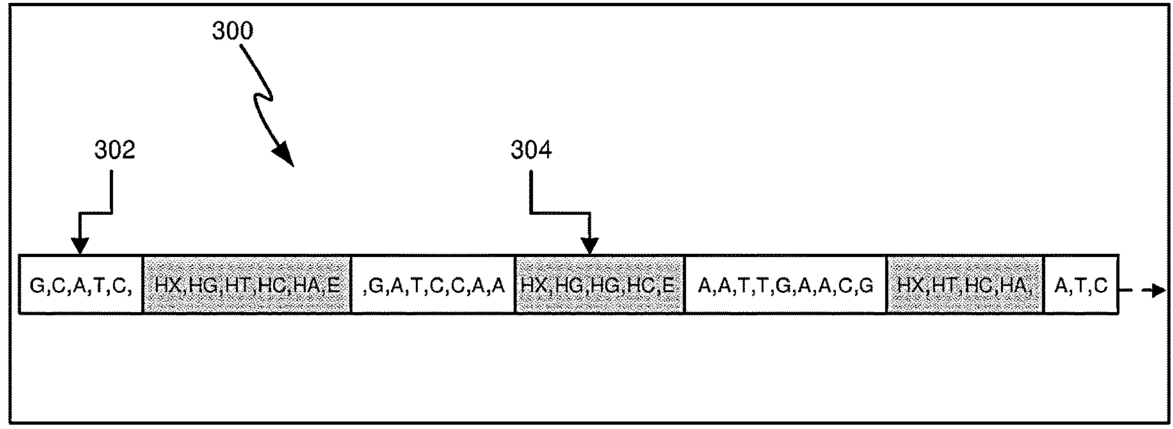
FIG. 3 is a schematic diagram of a software hox genome for use in construction of a neural network such as that of FIG. 2.

FIG. 3 is a schematic diagram of at least part of a software hox genome 300 for use in construction of a neural network such as that of FIG. 2. The software hox genome is a sequence of characters and the sequence may extend further as indicated by the dotted arrow in FIG. 3. Portions of the sequence which are unshaded in FIG. 2 such as region 302 are norm genes and portions which are shaded such as region 304 are hox genes.

A norm gene encodes a zone of a neural network but does not control how the zone is expressed. A norm gene is a sequence of characters where each character encodes information about the zone such as a by encoding a number of nodes in the zone, a topology of the zone, an activation function of the nodes in the zone. A topology of a zone is a spatial arrangement of nodes and how they are connected by edges. In an example, a norm gene encodes a zone of the neural network as one or more of: a fully connected layer, a convolutional layer, a recurrent layer, an encoder neural network, a decoder neural network, an autoencoder neural network.

Each hox gene is a sequence of characters beginning with a specified character group HX and ending with a specified character group E. In this way a hox gene is easily distinguished from a norm gene when reading the character sequence. Within a hox gene there is a series of pairs of characters, each pair beginning with H such as HX, HG, HT. Each pair of characters denotes or encodes how the norm gene immediately preceding the hox gene is to be expressed. That is, a character pair in a hox gene encodes any of: a quantity of instances of the zone in the neural network, a position of the zone in the neural network, a gradient of weights in the zone, a depth of nested zones within the zone, an amount of bias to be applied to weights in the zone.

Using a character string encoding is a flexible schema that is compact and fast to process and yet more flexible than pure binary level encoding. It is straightforward to debug and reverse inference a software hox genome once evolved as it remains human readable.

One of the mechanisms biological hox genes utilize is to take advantage of the bi-lateral symmetry in most natural organisms, i.e. in order to allow a smaller number of genes to regulate the expression of cells. Given the symmetric architecture of many neural network designs the present technology uses the same principle to reduce the number of genes in the software hox genome.

A second hox capability is to control the gradient of proteins within the developing embryo in order to shape the resulting cell expression. By manipulating this gradient function, a small number of hox genes can regulate large areas of the phenotype. (Avoiding the need for a 1 to 1 mapping of hox gene to normal gene.) The present technology uses a similar gradient control. For example, by controlling the gradient of weights across the neural network within a specific zone.

One of the methods living systems apply within a hox process is to translate each hox gene into the expression of specific proteins. These proteins then act as a signal to the neighboring normal genes on whether to activate or not. If activated the normal genes, then express the formation of the required cells in that region of the growing phenotype/embryo.

In the present technology, software hox genes regulate the expression of a simulated protein signal, which can be any form of bit, or character string sequence. This in turn activates the norm genes that control zone formation as explained above.

In an example, when a zone forms, it has a set of evolution specified properties such as one or more of:

Scope: number of neurons covered by the zone.

Depth: number of layers affected by the zone.

Recursion: number of sub-zones

Weight control: the level of activation or suppression of the synapse weights for the neurons within the zone. Weight control is implemented using a multiplier factor gamma in the range: −1.0 to +1.0.

Figure 4:
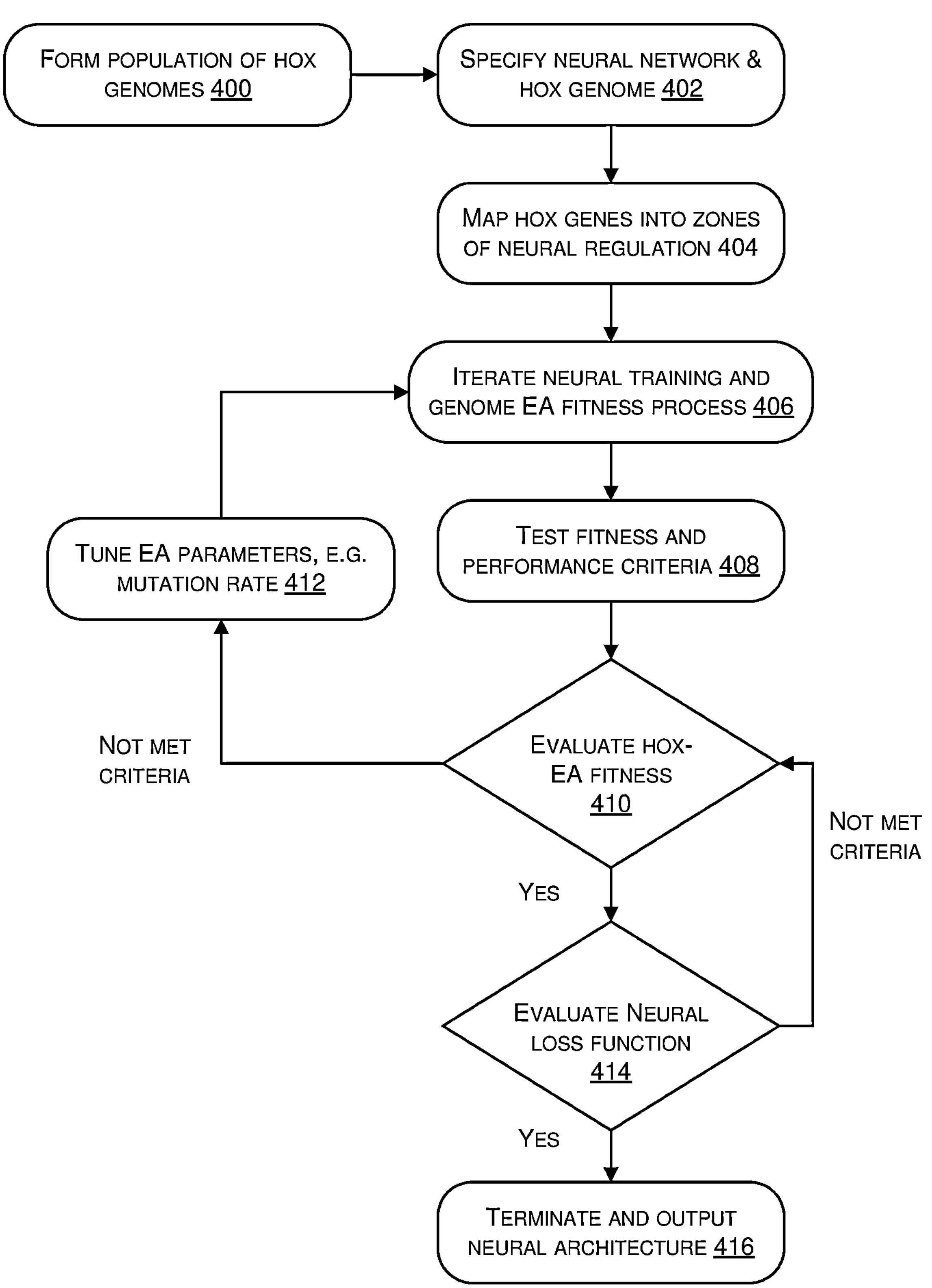
FIG. 4 is a flow diagram of a method performed by the neural network construction engine of FIG. 1.

FIG. 4 is a flow diagram of a method performed by the neural network construction engine of FIG. 1. FIG. 4 is now explained for the case where a neural network is constructed for an image processing task such as object recognition. A population of software hox genomes is formed 400 such as by random generator or using rules. Each software hox genome encodes a neural network as explained above so that for each software hox genome there is a specified neural network 402 where hox genes of the software hox genome map 404 into zones of the neural network.

An iterative process 406 is executed which iterates between neural network training and a software hox genome evolutionary algorithm fitness process. This involves computing a fitness of each of the software hox genomes using the fitness function by, for each software hox genome: configuring the neural network according to the software hox genome; training the neural network using training images; measuring performance of the trained neural network at the image processing task and computing the fitness of the software hox genome according to the measured performance.

Configuring the neural network according to the software hox genome comprises decoding the software hox genome and applying the decoding to the neural network by changing the number of nodes in particular zones, replicating zones, adjusting weights, changing connections between nodes and so on.

Training the neural network comprises using labeled images of objects and using supervised training to train the neural network for object recognition using backpropagation.

Measuring the performance of the trained neural network at the image processing task comprises using a validation set of data comprising images of objects which have been labelled. The number of errors made by the neural network when recognizing objects depicted in the validation set is measured. Any other performance measure can be used.

Computing the fitness of the software hox genome according to the measured performance involves mapping the measured performance into a fitness value which is a numerical value in a specified range.

The evolutionary algorithm further comprises, selecting a plurality of the software hox genomes as parents which have a fitness above a threshold; generating offspring software hox genomes from the parents; and replacing the least-fit software hox genomes in the population with the offspring.

Generating offspring software hox genomes from the parents comprises using one or more of cross-over, mutation or fitness proportional selection.

Iteration at process 406 stops when convergence is reached or after a specified number of iterations. A best one of the population of software hox genomes is selected (where best is the software hox genome with the highest fitness) and compared 408 against performance criteria 100. The performance criteria 100 were optionally input to the neural construction engine 108 by a user or are preconfigured or set by an algorithm. Testing the fitness and performance criteria 408 comprises evaluating the fitness 410 of the selected software hox genome and comparing it with the performance criteria. If the test is passed a neural network loss function is evaluated at operation 414. If the neural network loss function is below a threshold the process terminates and the neural network architecture is output 416.

At operation 414 if the neural network loss is found to be unacceptable, the process returns to operation 410.

At operation 410 if the fitness is found to not meet the performance criteria the process moves to operation 412 whereby parameters of the evolutionary algorithm are tuned. In an example, a mutation rate used by the evolutionary algorithm is increased. After the tuning the process moves to operation 406 where the iteration of neural training and evolutionary algorithm fitness proceeds.

The process of FIG. 4 is used to prune existing neural networks in some cases. This is useful to make existing neural networks more efficient. It is also useful where a neural network which has been trained for a first task is being deployed for a different, second task.

An existing neural network is encoded by encoding zones of the neural network into a software hox genome. Any parts of the neural network which do not fall within a zone are encoded as norm genes which do not have associated hox genes.

The encoding of the existing neural network is processed as part of a population of software hox genes using the process of FIG. 4 to yield a selected software hox genome from the population. The selected software hox genome is then decoded into a neural network which is overlaid onto the initial neural network. Any regions of the initial neural network which are not overlaid are pruned and weights of the initial neural network are optionally matched to the overlying weights.

The technical challenge of how to prune DLN, with large numbers of layers and weights is a significant one. Such pruning can offer significant gains in reduced memory requirement and computing efficiency. However, the current methods are manually driven and in effect a blind search. The present technology applies state-of-the art evolutionary concepts with a hox genomic network to evolve a template, containing multiple zones, that is overlaid on the DLN, to achieve a pruning effect.

The neural network construction engine of the disclosure operates in an unconventional manner to construct compact neural networks which perform well at a specified task.

The neural network construction engine, by combining neural network training and an evolutionary algorithm, through the use of software hox genomes to encode neural networks, improves the functioning of a resulting neural network deployed on a computing device.

Figure 5:
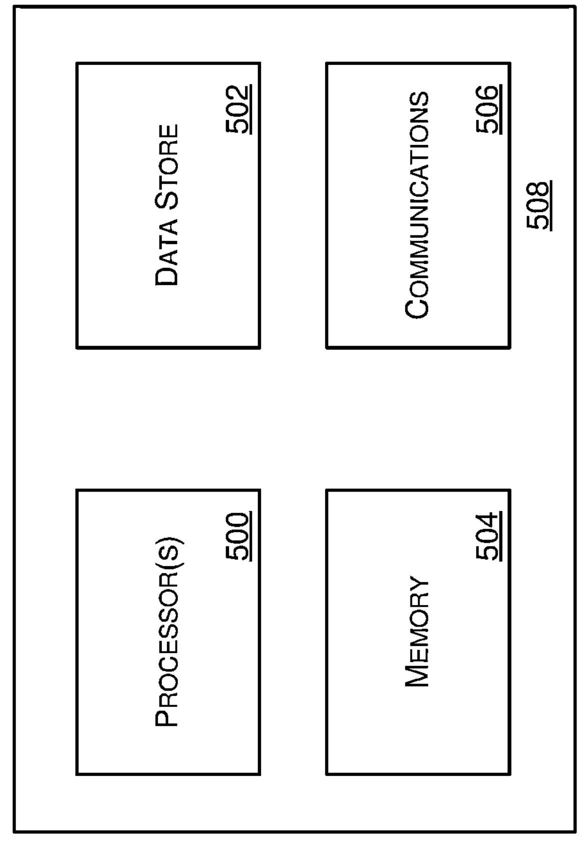
FIG. 5 illustrates an exemplary computing-based device in which embodiments of a neural network construction engine are implemented.

FIG. 5 illustrates various components of an exemplary computing-based device 508 which are implemented as any form of a computing and/or electronic device, and in which embodiments of a neural network construction engine 108 are implemented in some examples. In various examples the computing-based device is a resource constrained device such as wearable computer, a mobile phone handset, a smart watch.

Computing-based device 508 comprises one or more processors 500 which are microprocessors, controllers or any other suitable type of processors for processing computer executable instructions to control the operation of the device in order to construct neural networks for specified tasks such as image processing tasks, telecommunications network security tasks, telecommunications network traffic management tasks or other tasks. In some examples, for example where a system on a chip architecture is used, the processors 500 include one or more fixed function blocks (also referred to as accelerators) which implement a part of the method of FIG. 4 in hardware (rather than software or firmware). Platform software comprising an operating system or any other suitable platform software is provided at the computing-based device to enable application software to be executed on the device. Data store 502 holds neural network instances, training data, software hox genomes and other data.

The computer executable instructions are provided using any computer-readable media that is accessible by computing based device 508. Computer-readable media includes, for example, computer storage media such as memory 504 and communications media. Computer storage media, such as memory 504, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 504) is shown within the computing-based device 508 it will be appreciated that the storage is, in some examples, distributed or located remotely and accessed via a network or other communication link (e.g. using communications component 506 which is a network card, a wireless antenna or other component which enables the computing-based device 508 to communicate with other computing entities).

The computing-based device is arranged to output display information to a display device which may be separate from or integral to the computing-based device. The display information may provide a graphical user interface such as to display a neural network architecture with marks indicating zones and types of zones.

A method of constructing a neural network comprising:

generating a population of software hox genomes, each software hox genome encoding a neural network and comprising, for each of a plurality of zones of a neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone;

applying an evolutionary algorithm to the population of software hox genomes where a fitness function of the evolutionary algorithm comprises a performance of a neural network encoded by a software hox genome on a specified task;

outputting from the evolutionary algorithm, one of the software hox genomes and constructing a neural network encoded by the software hox genome; and using the constructed neural network to carry out the specified task.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method of image processing comprising:

generating a population of software hox genomes, each software hox genome encoding a neural network and comprising, for each zone of a plurality of zones of the neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone;

applying an evolutionary algorithm to the population of software hox genomes where a fitness function of the evolutionary algorithm comprises a performance of the neural network encoded by a software hox genome on an image processing task, where the neural network has been trained for the image processing task using training images;

outputting from the evolutionary algorithm, one of the software hox genomes and constructing the neural network encoded by the software hox genome; and processing an image using the constructed neural network in order to perform an image processing task.

2. The method of claim 1, wherein the fitness function of the evolutionary algorithm also rates smaller neural networks over larger neural networks so as to encourage the smaller neural networks to be evolved.

3. The method of claim 1, wherein applying the evolutionary algorithm comprises:

computing a fitness of each of the software hox genomes using the fitness function, by, for each software hox genome, by:

configuring the neural network according to the software hox genome;

training the neural network using the training images;

measuring performance of the trained neural network at the image processing task and computing the fitness of the software hox genome according to the measured performance; and wherein the evolutionary algorithm further comprises:

selecting a plurality of the software hox genomes as parents which have a fitness above a threshold;

generating offspring software hox genomes from the parents; and replacing least-fit software hox genomes in the population with the offspring software hox genomes.

4. The method of claim 1, wherein said each zone comprises a plurality of nodes and a plurality of edges of the neural network.

5. The method of claim 1, farther comprising: rendering a representation of the constructed neural network on a display, the representation comprising marks indicating the zones and topology of the zones in the neural network.

6. The method of claim 1, further comprising: allocating individual ones of the plurality of zones to different components of the image processing task.

7. The method of claim 3, wherein configuring the neural network according to the software hox genome comprises reusing one or more neural network zones.

8. The method of claim 1, wherein the software hox genome is a sequence of characters, and wherein each hox gene begins with a unique character combination and terminates with a specified character.

9. The method of claim 8, wherein the sequence of characters comprises one or more norm genes, each norm gene comprising characters encoding a zone of the neural network by encoding a number of nodes in the zone, a topology of the zone, an activation function of the nodes in the zone.

10. The method of claim 9, wherein each of the norm genes encodes the zone of the neural network as one or more of: a fully connected layer, a convolutional layer, a recurrent layer, an encoder neural network, a decoder neural network, an autoencoder neural network.

11. The method of claim 1, wherein constructing the neural network comprises pruning an existing neural network.

12. A method of detecting security breach events in a telecommunications network comprising:

generating a population of software hox genomes, each software hox genome encoding a neural network and comprising, for each zone of a plurality of zones of the neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone;

applying an evolutionary algorithm to the population of software hox genomes where a fitness function of the evolutionary algorithm is a performance of the neural network encoded by a software hox genome on detection of the security breach events in the telecommunications network, where the neural network has been trained using labeled event data from the telecommunications network;

outputting from the evolutionary algorithm, one of the software hox genomes and constructing the neural network encoded by the software hox genome; and processing measurements from the telecommunications network using the constructed neural network in order to detect the security breach events.

13. An image processing apparatus comprising:

one or more processors; and computer storage memory having computer-executable instructions stored thereon which, when executed by the one or more processors, implement a method comprising:

generating a population of software hox genomes, each software hox genome encoding a neural network and comprising, for each zone of a plurality of zones of the neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone;

applying an evolutionary algorithm to the population of software hox genomes where a fitness function of the evolutionary algorithm comprises a performance of the neural network encoded by a software hox genome on an image processing task, where the neural network has been trained for the image processing task using training images;

outputting from the evolutionary algorithm, one of the software hox genomes and constructing the neural network encoded by the software hox genome; and processing an image using the constructed neural network in order to perform an image processing task.

14. The image processing apparatus of claim 13, wherein the fitness function of the evolutionary algorithm also rates smaller neural networks over larger neural networks so as to encourage the smaller neural networks to be evolved.

15. The image processing apparatus of claim 13, wherein applying the evolutionary algorithm comprises:

computing a fitness of each of the software hox genomes using the fitness function, for each software hox genome, by:

configuring the neural network according to the software hox genome;

training the neural network using the training images;

measuring performance of the trained neural network at the image processing task and computing the fitness of the software hox genome according to the measured performance; and wherein the evolutionary algorithm further comprises:

selecting a plurality of the software hox genomes as parents which have a fitness above a threshold;

generating offspring software hox genomes from the parents; and replacing least-fit software hox genomes in the population with the offspring software hox genomes.

16. The image processing apparatus of claim 13, wherein:

the software hox genome is a sequence of characters, and wherein each hox gene begins with a unique character combination and terminates with a specified character; and the sequence of characters comprises one or more norm genes, each norm gene comprising characters encoding a zone of the neural network by encoding a number of nodes in the zone, a topology of the zone, an activation function of the nodes in the zone.

17. The image processing apparatus of claim 16, wherein each of the norm gene encodes the zone of the neural network as one or more of: a fully connected layer, a convolutional layer, a recurrent layer, an encoder neural network, a decoder neural network, an autoencoder neural network.

18. The image processing apparatus of claim 13, wherein constructing the neural network comprises pruning an existing neural network.

19. An apparatus in a telecommunications network for detecting security breach events, the apparatus comprising:

one or more processors; and computer storage memory having computer-executable instructions stored thereon which, when executed by the one or more processors, implement a method comprising:

generating a population of software hox genomes, each software hox genome encoding a neural network and comprising, for each zone of a plurality of zones of the neural network, a hox gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone;

applying an evolutionary algorithm to the population of software hox genomes where a fitness function of the evolutionary algorithm comprises a performance of the neural network encoded by a software hox genome on detection of the security breach events in the telecommunications network, where the neural network has been trained using labeled event data measured from the telecommunications network;

outputting from the evolutionary algorithm, one of the software hox genomes and constructing the neural network encoded by the software hox genome; and processing measurements from the telecommunications network using the constructed neural network in order to detect the security breach events.

20. A telecommunications network for detecting security breach events, the telecommunications network comprising an apparatus, wherein the apparatus comprises:

one or more processors; and computer storage memory having computer-executable instructions stored thereon which, when executed by the one or more processors, implement a method comprising:

generating a population of software hox genomes, each software hox genome encoding a neural network and comprising, for each zone of a plurality of zones of the neural network, a box gene and at least one norm gene, where the norm gene encodes the zone and the hox gene controls at least one of: a quantity of instances of the zone in the neural network, a position of the zone in the neural network, a gradient of weights in the zone, a depth of nested zones within the zone, an amount of bias to be applied to weights in the zone:

applying an evolutionary algorithm to the population of software hox genomes where a fitness function of the evolutionary algorithm comprises a performance of the neural network encoded by a software hox genome on detection of the security breach events in the telecommunications network, where the neural network has been trained using labeled event data measured from the telecommunications network;

outputting from the evolutionary algorithm, one of the software hox genomes and constructing the neural network encoded by the software hox genome; and processing measurements from the telecommunications network using the constructed neural network in order to detect the security breach events.

* * * * *